United States Patent [19]

Sakamoto et al.

[11] Patent Number: 5,391,335
[45] Date of Patent: Feb. 21, 1995

[54] METHOD OF PRODUCING A FOAM-INSULATED ELECTRIC WIRE USING A BLOWING AGENT MIXTURE

[75] Inventors: Kazuhide Sakamoto, Tokyo; Masanobu Sugimura, Ichihara, both of Japan

[73] Assignee: The Furukawa Electric Co., Ltd., Tokyo, Japan

[21] Appl. No.: 86,505

[22] Filed: Jul. 1, 1993

Related U.S. Application Data

[63] Continuation-in-part of Ser. No. 812,754, Dec. 23, 1991, abandoned.

[30] Foreign Application Priority Data

Dec. 26, 1990 [JP] Japan .................... 2-406865
Nov. 11, 1991 [JP] Japan .................... 3-294257

[51] Int. Cl.$^6$ .............................. B29C 67/22
[52] U.S. Cl. ................... 264/45.9; 264/46.9; 264/53; 264/DIG. 5
[58] Field of Search ............... 264/45.9, 51, 53, 46.4, 264/DIG 5, 46.9

[56] References Cited

U.S. PATENT DOCUMENTS

| | | | |
|---|---|---|---|
| 4,146,562 | 3/1979 | Fukushima et al. | 264/45.5 |
| 4,182,734 | 1/1980 | Takano et al. | 264/40.5 |

FOREIGN PATENT DOCUMENTS

| | | |
|---|---|---|
| 2402203 | 7/1974 | Germany . |
| 1177428 | 1/1970 | United Kingdom . |
| 2167000 | 5/1986 | United Kingdom . |

*Primary Examiner*—Allan R. Kuhns
*Attorney, Agent, or Firm*—Frishauf, Holtz, Goodman & Woodward

[57] ABSTRACT

In producing a foam insulated electric wire having an insulating layer made of a polyolefin foam, a foaming agent is employed, which is a liquid mixture of at least two kinds of compounds selected from the group consisting of ethers, esters, ketones and saturated hydrocarbons having boiling points of 100° C. or below, or a liquid mixture of at least one kind of compound selected from the group consisting of ethers, esters, ketones and saturated hydrocarbons having boiling points of 100° C. or below and at least one kind of liquid compound selected from the group consisting of ethers, esters, ketones, saturated hydrocarbons and alcohols having boiling points higher than 100° C. but not exceeding 150° C. Thus, a foam insulating layer having a high cell content and a low deformation ratio become available. Since the foam insulating layer has a high cell content and a low deformation ratio, the foam insulating layer, if reduced in diameter, is hardly squeezed. Since the foaming agent is a liquid, it can be supplied in an exact amount. The obtained wire is useful as a core applied to a high-speed signal transmission cable, an under-carpet cable, etc.

11 Claims, 1 Drawing Sheet

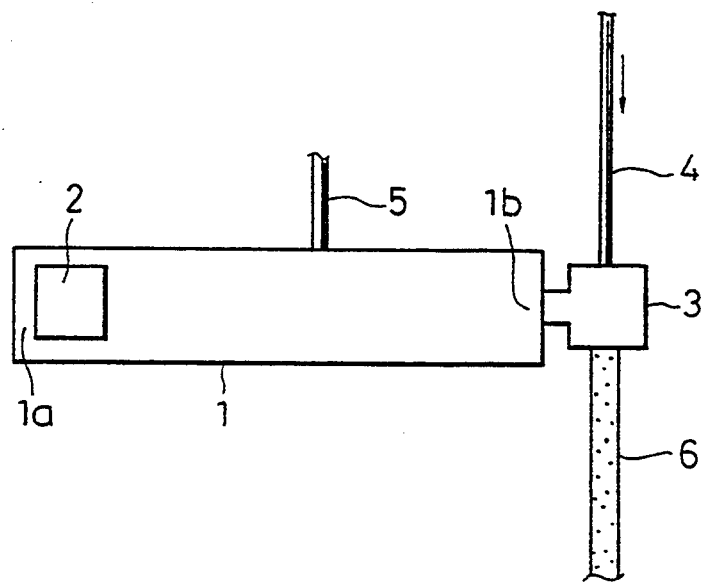

METHOD OF PRODUCING A FOAM-INSULATED ELECTRIC WIRE USING A BLOWING AGENT MIXTURE

This application is a continuation-in-part application of application Ser. No. 07/812,754, filed Dec. 23, 1991, now abandoned, the entire contents of which are hereby incorporated by references herein.

BACKGROUND OF THE INVENTION

1. Field of the Invention

The present invention relates to a method of producing a foam-insulated electric wire having an insulating layer of a polyolefin foam with a high cell content and high strength.

2. Description of the Prior Art

For example, as a cable for interconnecting computers, a foam-insulated electric wire has widely been in use, wherein a conductor is coated with a foam insulating layer of, for example, a polyolefin resin, thereby increasing a velocity of signal propagation (vop) as much as possible.

An example of this method of producing a foam-insulated wire will now be described with reference to FIG. 1.

A screw extruder 1 has a rear end portion 1a provided with a resin inlet 2, and an extrusion port 1b provided with a crosshead portion 3 having a die. A polyolefin resin such as polyethylene is supplied into the resin inlet 2 of the screw extruder 1. The die is held within the crosshead portion 3 so that the axis of the die intersects at right angles with the axis of the screw extruder. A conductor 4 is continuously guided into the die in the direction of the arrow.

The temperature of the screw extruder 1 is controlled at a predetermined value. The resin supplied into the resin inlet 2 is conveyed to the extrusion port 1b, as being melted and kneaded by the screw of the extruder 1. At this time, a predetermined amount of a foaming agent (also referred to as a "blowing agent") is supplied into a foaming agent inlet formed between the resin inlet 2 and the extrusion port 1b.

The supplied resin with some additives and supplied foaming agent are kneaded in the extruder 1 into a molten mixture which is about to foam. The mixture is supplied from the extrusion port 1b to the crosshead portion 3. Then, the mixture is extruded from the die held in the crosshead portion 3. The molten mixture coats the periphery of the conductor 4, which continuously runs through the die in the direction of arrow, and is foamed into a foam-insulating layer.

In this way, the conductor 4, which runs continuously through inside the die, is coated with the foam-insulating layer by the foam extrusion process, and an object product or a foam-insulated electric wire 6 is obtained.

Foaming agents in use for the foam extrusion coating process are chlorofluorocarbon (known as "Flon"), nitrogen, carbon dioxide, propane, or butane, which are gasses at a room temperature and under atmospheric pressure and does not react with polyolefin resin, or an organic solvent having a low boiling point, such as n-pentane, n-hexane, methanol or ethanol. In particular, Flon has widely been used because of the handiness and effectiveness as a foaming agent.

Of the above foaming agents, a gas agent is supplied in a predetermined amount into a foaming agent inlet 5 by using a gas flowmeter or a gas pressure regulator. An organic solvent having a low boiling point is also supplied into the inlet 5 by using a feeding pump or the like. In the case of a gas which is a gas at a room temperature and under atmospheric pressure, like some Flon, and has a low vapor pressure, such a gas is once pressurized under a relatively low pressure to be liquefied and then supplied.

Flon, which has been dominantly employed as a foaming agent, depletes the ozone layer. It is thus planned that the use of specified Flon having a considerable ozone depletion potential is to be completely phased out by the year of 2000 and the use of other kinds of Flon is to be totally phased out in the not too distant future.

Against this background, in the field of production of foamed polyolefin, the development of a pollution-free foaming agent substituted for Flon is strongly required.

For foam-insulated electric wires used in a cable for high-speed signal transmission, the foaming degree of the foam insulating layer coated on a conductor has been increased, and a diameter of these wires has been reduced.

However, the more subsisting cells of a foam insulating layer coated on a conductor increase and the thinner the thickness of a foam insulating layer becomes, the more the toughness of the insulating layer is sacrificed. Thus, the foam insulating layer may be squeezed and the conductor may be exposed owing to the force arising when the terminal of the foam-insulated electric wire is processed during wiring work, or the insulating layer may be squeezed by external pressure, causing a disadvantage in that electrical characteristics of the foam-insulated electric wire, such as velocity of signal propagation (vop), characteristic impedance, and capacitance, tend to shift.

In addition, the thinner the thickness of a foam insulating layer, the smaller the quantity of a foaming agent supplied in the foaming process. In this case, it is necessary to exactly control the quantity of a supplied foaming agent. If the quantity of supplied foaming agent were uneven, the thickness of the foam insulating layer and the electrical characteristics of the foam-insulated electric wire would also become unstable.

In the meantime, it is very difficult to exactly supply a small amount of the aforementioned gas by finely controlling the quantity of the gas by means of a flowmeter or the like. If the gas is liquefied, it becomes possible to exactly supply a small amount of the gas, but the liquefying process requires very high pressure or very low temperature. This is not industrially advantageous from the viewpoint of safety and production cost.

It appears that, as a foaming agent substitutable for Flon, the aforementioned organic solvent having a boiling point is suitable, and it can exactly be supplied in a minute quantity.

However, in the case where a foam with a high cell content is produced by using an organic solvent having a lower boiling point, if a cell content increases, the toughness of the foam decreases accordingly and the deformation factor at normal temperature increases.

OBJECTS AND SUMMARY OF THE INVENTION

An object of the present invention is to provide a method of producing a foam-insulated electric wire having a foam insulating layer made of a foamed polyolefin without a possible decrease in toughness even if a cell content thereof is increased.

Another object of the invention is to provide a method of producing, without using Flon, a foam-insulated electric wire having a foam insulating layer with a high cell content and a less diameter, wherein a pollution-free liquid compound is employed as a foaming agent and the amount of the foaming agent to be supplied is controllable exactly.

In order to achieve the above objects, there is provided a method of producing a foam-insulated electric wire, comprising the steps of: supplying a polyolefin resin composition into a resin inlet of a screw extruder; injecting a foaming agent through a portion between the resin inlet and an extrusion port of the extruder; and extruding a molten mixture of the polyolefin resin composition and the foaming agent and coating the periphery of a conductor with the molten mixture, wherein the foaming agent is a liquid mixture of (i) at least two liquid compounds of Group (I) selected from the group consisting of at least one ether, at least one ester, at least one ketone and at least one saturated hydrocarbon, having boiling points of 100° C. or below or (ii) a liquid mixture of at least one liquid compound of Group (II) selected from the group consisting of at least one ether, at least one ester, at least one ketone, at least one saturated hydrocarbon and at least one alcohol, having boiling points higher than 100° C., but not exceeding 150° C. and at least one liquid compound of the Group (I).

BRIEF DESCRIPTION OF THE FIGURE

The figure is a diagram showing an example of an apparatus for producing a foam-insulated electric wire.

DETAILED DESCRIPTION OF THE INVENTION

Polyolefin resins employed in the present invention include, for example, polyethylene such as a low density polyethylene, intermediate density polyethylene, high density polyethylene or linear low density polyethylene; polypropylene; and a copolymer of polyolefin such as ethylene-acrylic acid copolymer, ethylene-methylmethacrylate copolymer, ethylene-ethylacrylate copolymer, ethylene-vinyl acetate copolymer or ethylene-propylene copolymer. The resins mentioned above may be employed singly or in a mixture of at least two kinds.

As a preferred polyolefin resin, a low density polyethylene, high density polyethylene or polypropylene having a low relative dielectric constant, further, a mixture of a low density polyethylene and high density polyethylene, a mixture of a intermediate density polyethylene and a high density polyethylene, a mixture of a low density polyethylene and a intermediate density polyethylene and a high density polyethylene, a mixture of a ethylene-propylene copolymer and a high density or high molecular weight polyethylene, or a mixture of ethylene-methylmethacrylete copolymer is used.

The method of the present invention is characterized in the foaming agent employed. The foaming agent is a liquid mixture of at least two kinds of organic compounds. These organic compounds are selected from specific groups and have boiling points within a specific range. The foaming agents are generally classified into the following two groups:

The first foaming agent is a liquid mixture of at least two kinds of liquid compounds selected from the group (hereinafter called Group I) consisting of ethers, esters, ketones and saturated hydrocarbons having boiling points of 100° C. or below.

To prepare the first foaming agent, two or more of the same type of liquid compounds may be selected and mixed, or two or more of different types of liquid compounds may be selected and mixed, as long as the liquid compounds used have boiling points of 100° C. or below. For example, the first foaming agent can comprise two different ethers, e.g., diethyl ether and vinyl ethyl ether, two different esters, e.g., methyl formate and ethyl formate, two different ketones, e.g. methyl ethyl ketone and acetone, two different saturated hydrocarbons, an ether and an ester, an ether and a ketone, an ester and a ketone, an ether and a saturated hydrocarbon, an ester and a saturated hydrocarbon, a ketone and a saturated hydrocarbon, etc.

The second foaming agent is a liquid mixture of at least one kind of liquid compound selected from Group I, and at least one kind of liquid compound selected from the group (hereinafter called Group II) consisting of ethers, esters, ketones, saturated hydrocarbons and alcohols having boiling points higher than 100° C. but not exceeding 150° C. For example, the second foaming agent can comprise two different ethers, e.g. ethylene glycol monomethyl ether and ethylene glycol monoethyl ether, two different esters, e.g., n-propyl acetate and n-propyl formate, two different ketones, e.g., 2-pentanone and 3-pentanone, two different saturated hyudrocarbons, two different alcohols, an ether and an ester, an ether and an alcohol, etc.

The liquid compound to be selected from Group I may be one or more liquid compounds of the same type, or one or more liquid compounds selected from different types, as mentioned above, as long as the compounds used have boiling points of 100° C. or below. Similarly, the liquid compound to be selected from Group II may be one or more of the same type of liquid compounds, or one or more liquid compounds selected from different types, as long as they have boiling points higher than 100° C. but not exceeding 150° C. Thus, the second foaming agent is prepared by mixing the liquid compound(s) selected from Group I and the liquid compound(s) selected from Group II.

The second foaming agent used in the method of the present invention should not contain a liquid compound having a boiling point higher than 150° C. If a liquid compound having such a high boiling point is used, the resulting foam insulating layer obtained by using the foaming agent has an extremely low cell content (mentioned later), and the liquid compound remains as it is, making it difficult to put the product in practical use.

If a foaming agent containing no liquid compound of Group I is used as a component of the second foaming agent, the cell content of the resulting foam insulating layer is very low.

On the other hand, if the second foaming agent contains an alcohol having a boiling point of 100° C. or below, the resulting foam insulating layer has a large deformation ratio (discussed hereinbelow).

Thus, in the case of using an alcohol to prepare the second foaming agent, an alcohol having a boiling point higher than 100° C. but not exceeding 150° C. must be used.

It is desirable that the liquid compounds selected from Group I have boiling points of 80° C. or below, and in particular one of the selected liquid compounds have a boiling point of 40° C. or below.

It is desirable that the liquid compound selected from Group II have a boiling point higher than 100° C. but not exceeding 120° C.

In the present invention, the cell content and the deformation ratio at normal temperature were measured by the methods described below.

To determine the cell content (expansion ratio) (%), first, the coaxial capacitance of a produced electric wire was measured, then the effective relative dielectric constant ($\epsilon_s$) was calculated according to equation (1) below, and the cell content (F) was calculated according to equation (2):

$$\epsilon_s = \frac{C}{24.13} \times \log \frac{d_2}{d_1} \quad (1)$$

$$F = \frac{(2\epsilon_s + \epsilon_0)(\epsilon_a - \epsilon_s)}{3\epsilon_s(\epsilon_a - \epsilon_0)} \times 100 \ (\%) \quad (2)$$

where $\epsilon_a$: effective relative dielectric constant of insulation material;

$\epsilon_0$: effective dielectric constant of air;

C: coaxial capacitance (pF/m);

$d_1$: conductor outer diameter (mm); and $d_2$: wire outer diameter (mm).

The normal temperature deformation ratio (%) was measured by the method provided by JISC 3005, item 25, as follows:

First, the thickness (mm) of the insulating layer was measured at a temperature of 23° C. Then, the wire was placed between two parallel plates, and a weight of 500 g was applied thereto. After 15 minutes passed, the thickness (mm) of the insulating layer was measured. The deformation ratio was calculated according to the following equation (3):

$$\text{Normal temperature deformation ratio (\%)} = \frac{\text{Thickness before weighting (mm)} - \text{Thickness after weighting (mm)}}{\text{Thickness before weighting (mm)}} \times 100 \quad (3)$$

The reason why the first foaming agent is prepared by mixing at least two liquid compounds of Group I and the second foaming agent is prepared by mixing at least one liquid compound selected from Group I and at least one liquid compound selected from Group II is described hereafter. If the first and second foaming agents are prepared in this manner, the deformation ratio of the produced foam is lower than in the case where each liquid compound is singly employed as a foaming agent, even though the cell content is equal. The reason why this advantage is obtained is not fully certain, however, it appears that, by using together liquid compounds having different gasification conditions, cells with different cell diameters are mixed in the obtained foam and the deformation ratio can be reduced while the high void content is attained.

As the liquid compound belonging to ethers of Group I, employed is one or more of diethyl ether (boiling point: 34.5° C.), vinyl ethyl ether (boiling point: 35.7° C.), di-isopropyl ether (boiling point: 68.5° C.), di-n-propyl ether (boiling point: 90.6° C.) and vinyl butyl ether (boiling point: 94.3° C.).

In particular, diethyl ether is desirable.

As esters of Group I, employed is one or more of methyl formate (boiling point: 32.0° C.), ethyl formate (boiling point: 54.1° C.), methyl acetate (boiling point: 56.3° C.), ethyl acetate (boiling point: 76.8° C.), methyl propionate (boiling point: 79.7° C.), n-propyl formate (boiling point: 81.5° C.), isopropyl acetate (boiling point: 89.5° C.), isobutyl formate (boiling point: 97.7° C.), and ethyl propionate (boiling point: 99.1° C.).

As ketones of Group I, either acetone (boiling point: 56.1° C.) or methyl ethyl ketone (boiling point: 79.5° C.) or both are employed.

As saturated hydrocarbons of Group I, employed is one or more of i-pentane (boiling point: 27.9° C.), n-pentane (boiling point: 36.1° C.), cyclopentane (boiling point: 49.3° C.), i-hexane (boiling point: 60.3° C.), 3-methyl pentane (boiling point: 64.0° C.), n-hexane (boiling point: 68.7° C.), cyclohexane (boiling point: 80.7° C.), and n-heptane (boiling point: 98.4° C.).

Of the above-described liquid compounds of Group I, when diethyl ether, methyl formate, ethyl formate, methyl acetate, ethyl acetate, acetone, methyl ethyl ketone, n-pentane and n-hexane are employed, a foam having a small cell diameter, high cell density, and high cell content can be obtained. The use of these liquid compounds is also advantageous in terms of cost.

As the liquid compound of ethers belonging to Group II, employed is one or more of ethylene glycol monomethyl ether (boiling point: 124.5° C.), ethylene glycol monoethyl ether (boiling point: 134.8° C.) and di-n-butyl ether (boiling point: 142.4° C.).

As esters, employed is one or more of n-propyl acetate (boiling point: 101.6° C.), n-butyl formate (boiling point: 106.8° C.), isobutyl acetate (boiling point: 112.2° C.), isopentyl formate (boiling point: 124.0° C.), n-butyl acetate (boiling point: 126.3° C.) and n-butyl propionate (boiling point: 146.8° C.).

As ketones, one or more of 2-pentanone (boiling point: 101.0° C.), 3-pentanone (boiling point: 101.5° C.), 4-methyl-2-pentanone (boiling point: 115.9° C.), 3-hexanone (boiling point: 125.0° C.), 2-hexanone (boiling point: 127.2° C.), 4-heptanone (boiling point: 144.0° C.) and 3-heptanone (boiling point: 145.0° C.).

As saturated hydrocarbons, employed is n-octane (boiling point: 125.6° C.).

As alcohols, employed is one or more of 3-pentanol (boiling point: 115.6° C.), 1-butanol (boiling point: 117.7° C.), 2-pentanol (boiling point: 119.3° C.), 3-hexanol (boiling point: 134.5° C.), 1-pentanol (boiling point: 137.5° C.) and 2-hexanol (boiling point: 139.8° C.).

When preparing a first foaming agent, one or more kinds may be selected from the same kind ("ether kind", "ester kind", etc.) and mixed, or one or more kinds may be selected from different kinds and mixed. When the second foaming agent is prepared, at least one kind of liquid compound selected from Group I is mixed with one or more kinds selected from the same kind in Group II, or mixed with one or more kinds selected from different kinds in Group II. The combination of compounds may be determined on the basis of a required cell content and deformation ratio of foamed polyolefin shaped bodies to be produced.

When a foam insulating layer (as cores) are assembled into a high-speed signal transmission cable, a squeezing force is exerted on the core in the steps of extruding a skin layer or a sheath and carrying out wrapping of wires, tape wrapping and final twist. Thus, the foaming agent for the core may be prepared based on an ether-based combination of the above organic compounds so as to reduce a its deformation ratio at a room temperature and increase toughness.

In the case of an under-carpet cable or a cable bent in a narrow space, which requires a more toughness than a high-speed signal transmission cable, it is desirable to prepare a foaming agent on the basis of an ester-based combination of organic compounds.

The mixing ratio of the liquid compounds of the first foaming agent is not limited; however, for example, when two liquid compounds are mixed, a desirable mole ratio is 1:9 to 9:1. More desirably, it is 1:2 to 2:1.

The first foaming agent is desirable to be a liquid mixture containing at least diethyl ether and methyl acetate, a liquid mixture containing at least diethyl ether and ethyl acetate, or a liquid mixture containing at least methyl acetate and ethyl acetate. Of these, the liquid mixture of diethyl ether and methyl acetate with a mole ratio of 2:1 to 1:2 is most desirable.

The second foaming agent is prepared by mixing at least one kind of liquid compound of Group I described in connection with the first foaming agent, and at least one kind of liquid compound of Group II. The use of the liquid compound of Group II reduces the deformation ratio of the obtained foam and increases the toughness of the foam, but, in this case, the cell content is not remarkably increased.

It is thus desirable that the mixing ratio of the liquid compound of Group I to the liquid compound of Group II be determined such that the number of moles of the former, when used, is greater than that of the latter. Specifically, a desirable mole ratio of the former to the latter is 1:1 to 9:1.

In the method of the present invention, when the polyolefin resin is melted, kneaded and extruded by the extruder, it suffices to inject a predetermined amount of the first foaming agent or the second foaming agent in the foaming agent inlet formed between the resin inlet and the extrusion port.

At this time, a thermal decomposition foaming agent capable of generating nitrogen gas or carbon dioxide gas by thermal decomposition may be employed along with the above foaming agent. If necessary, the polyolefin resin to be melted and kneaded may be mixed with a foaming nuclear agent, an antioxidant, a pigment, or a cross-linking accelerator.

EXAMPLES AND CONTROLS

A resin composition prepared by mixing 100 parts by weight of low density polyethylene (density: 0.93 $g/cm^3$; melt index: 1.0 g/10 min.) with 1.0 part by weight of talc (foaming nuclear agent) and 0.3 part by weight of tetrakis-[methylene-3-(3', 5'-di-tert-butyl-4'-hydroxyphenyl) propionate] methane (antioxidant) was supplied in the resin inlet 2 of the screw extruder 1 (diameter: 30 mm) shown in the figure. Foaming agents shown in Tables 1 to 4 were injected from the foaming agent inlet 5 at a rate of 0.5 mol per 1 kg of the low density polyethylene, and melted and kneaded. The resulting molten mixture was extruded from the extrusion port 1b into the crosshead portion 3. The mixture was coated on an annealed copper wire element (diameter: 0.32 mm) running continuously through the crosshead portion 3. Thus, the foam-insulated electric cables having an outside diameter of about 1.0 mm in the finished state were produced.

The cell content and normal temperature deformation ratio of the foam insulating layer of each electric wire were measured by the methods described above. The measurement results are shown in Tables 1 to 4.

The cell content (%): a maximum cell content measured when the injection amount of the foaming agent of each example and the set temperature in the melting and kneading steps were varied.

The normal temperature deformation ratio (%): this ratio was measured under the conditions that the heating temperature was 23° C., the load was 500 g and the loading time was 15 minutes, in a heating deformation test stipulated in JISC 3005, item 25.

TABLE 1

| | FOAMING AGENTS (LIQUIDS) | | | | | | CHARACTERISTICS OF SHAPED BODIES | |
| --- | --- | --- | --- | --- | --- | --- | --- | --- |
| | KIND (A) | BOILING POINT (°C.) | GROUP | KIND (B) | BOILING POINT (°C.) | GROUP | MIXING RATIO (Molar Ratio: A/B) | CELL CONTENT (%) | NORMAL TEMPERATURE DEFORMATION RATIO (%) |
| Example 1 | methyl acetate | 56.3 | I | acetone | 56.1 | I | 1 | 62 | 5 |
| Example 2 | methyl acetate | 56.3 | I | methyl ethyl ketone | 79.5 | I | 1 | 57 | 3 |
| Example 3 | methyl acetate | 56.3 | I | n-pentane | 36.1 | I | 1 | 63 | 4 |
| Example 4 | methyl acetate | 56.3 | I | n-hexane | 68.7 | I | 1 | 52 | 2 |
| Example 5 | ethyl acetate | 76.8 | I | acetone | 56.1 | I | 1 | 56 | 4 |
| Example 6 | methyl formate | 32.0 | I | acetone | 56.1 | I | 1 | 63 | 5 |
| Example 7 | ethyl formate | 54.1 | I | aceloiie | 50.1 | I | 1 | 59 | 4 |
| Example 8 | methyl acetate | 56.3 | I | ethyl acetate | 76.8 | I | 1 | 58 | 4 |
| Example 9 | methyl acetate | 56.3 | I | methyl formate | 32.0 | I | 1 | 60 | 4 |
| Example 10 | ethyl acetate | 76.8 | I | ethyl formate | 54.1 | I | 1 | 57 | 3 |
| Example 11 | diethyl ether | 34.5 | I | methyl acetate | 56.3 | I | 1 | 69 | 8 |
| Example 12 | diethyl ether | 34.5 | I | ethyl acetate | 76.8 | I | 1 | 66 | 8 |
| Example 13 | diethyl ether | 34.6 | I | methyl formate | 32.0 | I | 1 | 71 | 9 |
| Example 14 | diethyl ether | 34.5 | I | ethyl formate | 54.1 | I | 1 | 67 | 8 |
| Example 16 | diethyl ether | 34.5 | I | acetone | 56.1 | I | 1 | 71 | 8 |
| Example 16 | diethyl ether | 34.5 | I | n-pentane | 36.1 | I | 1 | 66 | 7 |
| Example 17 | diethyl ether | 34.5 | I | i-pentane | 27.9 | I | 1 | 68 | 9 |

TABLE 2

| | FOAMING AGENTS (LIQUIDS) | | | | | | CHARACTERISTICS OF SHAPED BODIES | |
|---|---|---|---|---|---|---|---|---|
| | KIND (A) | BOILING POINT (°C.) | GROUP | KIND (B) | BOILING POINT (°C.) | GROUP | MIXING RATIO (Molar Ratio: A/B) | CELL CONTENT (%) | NORMAL TEMPERATURE DEFORMATION RATIO (%) |
| Example 18 | diethyl ether | 34.5 | I | vinyl ethyl ether | 35.7 | I | 1 | 72 | 7 |
| Example 19 | diethyl ether | 34.5 | I | methyl ethyl ketone | 79.5 | I | 1 | 57 | 9 |
| Example 20 | diethyl ether | 34.5 | I | n-hexane | 68.7 | I | 1 | 54 | 6 |
| Example 21 | methyl acetate | 56.3 | I | di-n-butyl ether | 142.4 | II | 2 | 51 | 5 |
| Example 22 | methyl acetate | 56.3 | I | n-butyl acetate | 126.3 | II | 2 | 57 | 8 |
| Example 23 | methyl acetate | 56.3 | I | 2-hexanone | 127.2 | II | 2 | 55 | 7 |
| Example 24 | methyl acetate | 56.3 | I | n-octane | 125.6 | II | 2 | 55 | 6 |
| Example 25 | methyl acetate | 56.3 | I | 1-butanol | 117.7 | II | 2 | 60 | 9 |
| Example 26 | diethyl ether | 34.5 | I | di-n-butyl ether | 142.4 | II | 2 | 53 | 6 |
| Example 27 | diethyl ether | 34.5 | I | n bnutyl acetate | 126.3 | II | 2 | 61 | 9 |
| Example 28 | diethyl ether | 34.5 | I | 2-hexanone | 127.2 | II | 2 | 58 | 7 |
| Example 29 | diethyl ether | 34.5 | I | n-octane | 125.6 | II | 2 | 57 | 8 |
| Example 30 | diethyl ether | 34.5 | I | 1-butanol | 117.7 | II | 2 | 65 | 10 |
| Example 31 | acetone | 56.1 | I | 1-butanol | 117.7 | II | 2 | 62 | 9 |
| Example 32 | n-hexane | 68.7 | I | 1-butanol | 117.7 | II | 2 | 57 | 8 |
| Example 33 | ethyl acetate | 76.8 | I | 1-butanol | 117.7 | II | 2 | 55 | 5 |
| Example 34 | di-i-propyl ether | 68.5 | I | 1-butanol | 117.7 | II | 2 | 57 | 6 |
| Example 35 | acetone | 56.1 | I | methyl ethyl ketone | 79.5 | I | 1 | 56 | 4 |
| Example 36 | n-pentane | 36.1 | I | n-hexane | 68.7 | I | 1 | 57 | 5 |

TABLE 3

| | FOAMING AGENTS (LIQUIDS) | | | | | | CHARACTERISTICS OF SHAPED BODIES | |
|---|---|---|---|---|---|---|---|---|
| | KIND (A) | BOILING POINT (°C.) | GROUP | KIND (B) | BOILING POINT (°C.) | GROUP | MIXING RATIO (Molar Ratio: A/B) | CELL CONTENT (%) | NORMAL TEMPERATURE DEFORMATION RATIO (%) |
| Control 1 | n-butyl acetate | 126.3 | II | di-n-butyl ether | 142.4 | II | 1 | 5 | 1 |
| Control 2 | n-butyl acetate | 126.3 | II | n-propyl acetate | 101.6 | II | 1 | 35 | 3 |
| Control 3 | n-butyl acetate | 126.3 | II | 3-pentane | 101.5 | II | 1 | 32 | 3 |
| Control 4 | n-butyl acetate | 126.3 | II | n-octane | 125.6 | II | 1 | 7 | 1 |
| Control 5 | n-butyl acetate | 126.3 | II | 1-butanol | 117.7 | II | 1 | 16 | 1 |
| Control 6 | methanol | 64.7 | — | di-n-butyl ether | 142.4 | II | 1 | 51 | 13 |
| Control 7 | methanol | 64.7 | — | n-propyl acetate | 101.8 | II | 1 | 60 | 14 |
| Control 8 | methanol | 64.7 | — | 3-pentane | 101.5 | II | 1 | 60 | 14 |
| Control 9 | methanol | 64.7 | — | n-octane | 125.6 | II | 1 | 55 | 14 |
| Control 10 | methanol | 64.7 | — | 1-butanol | 117.7 | II | 1 | 52 | 13 |
| Control 11 | methanol | 64.7 | — | diethyl ether | 34.5 | I | 1 | 72 | 17 |
| Control 12 | methanol | 64.7 | — | methyl acetate | 56.3 | I | 1 | 68 | 15 |
| Control 13 | methanol | 64.7 | — | acetone | 56.1 | I | 1 | 70 | 18 |
| Control 14 | methanol | 64.7 | — | n-hexane | 68.7 | I | 1 | 60 | 13 |
| Control 15 | methanol | 64.7 | — | ethanol | 78.3 | — | 1 | 70 | 16 |

TABLE 4

| | FOAMING AGENTS (LIQUIDS) | | | | | | CHARACTERISTICS OF SHAPED BODIES | |
|---|---|---|---|---|---|---|---|---|
| | KIND (A) | BOILING POINT (°C.) | GROUP | KIND (B) | BOILING POINT (°C.) | GROUP | MIXING RATIO (Molar Ratio: A/B) | CELL CONTENT (%) | NORMAL TEMPERATURE DEFORMATION RATIO (%) |
| Control 16 | methyl acetate | 56.3 | I | di-n-hexyl ether | 226.2 | — | 2 | 5 | 0 |
| Control 17 | methyl acetate | 56.3 | I | n-hexyl acetate | 171.5 | — | 2 | 10 | 1 |
| Control 18 | methyl acetate | 56.3 | I | 2-aotanone | 173.5 | — | 2 | 9 | 1 |
| Control 19 | methyl acetate | 56.3 | I | n-decane | 174.1 | — | 2 | 9 | 1 |
| Control 20 | methyl acetate | 56.3 | I | 1-hexanol | 157.9 | — | 2 | 13 | 1 |
| Control 21 | diethyl ether | 34.5 | I | — | — | — | — | 68 | 17 |
| Control 22 | methyl acetate | 56.3 | I | — | — | — | — | 67 | 17 |
| Control 23 | acetone | 56.1 | I | — | — | — | — | 68 | 19 |
| Control 24 | n-pentane | 36.1 | I | — | — | — | — | 70 | 20 |
| Control 25 | methanol | 64.7 | — | — | — | — | — | 64 | 20 |
| Control 26 | di-n-butyl ether | 142.4 | II | — | — | — | — | 0 | 1 |
| Control 27 | n-propyl acetate | 101.8 | II | — | — | — | — | 0 | 2 |
| Control 28 | 3-pentane | 101.5 | II | — | — | — | — | 5 | 1 |

TABLE 4-continued

| | FOAMING AGENTS (LIQUIDS) | | | | | | CHARACTERISTICS OF SHAPED BODIES | |
|---|---|---|---|---|---|---|---|---|
| | KIND (A) | BOILING POINT (°C.) | GROUP | KIND (B) | BOILING POINT (°C.) | GROUP | MIXING RATIO (Molar Ratio: A/B) | CELL CONTENT (%) | NORMAL TEMPERATURE DEFORMATION RATIO (%) |
| Control 29 | n-octane | 125.8 | II | — | — | — | — | 3 | 2 |
| Control 30 | 1-butanol | 117.7 | II | — | — | — | — | 7 | 4 |

As is clear from the data on the tables, when the foaming agents of Controls 1 to 5, wherein the boiling points of all liquid compounds were 100° C. or more, and the foaming agents of Controls 16 to 20, wherein the boiling point of either one of the liquid compounds was 100° C. or more, were employed, the cell contents of the obtained foams were low.

In the case of Controls 6 to 15 wherein alcohols having boiling points of 100° C. or below, the cell contents of the obtained foams were high but the normal temperature deformation ratios thereof were remarkably low.

In addition, when only one kind of liquid compound was employed, as in Controls 21 to 25, the cell contents were high but the normal temperature deformation ratio were low, or, as in Controls 26 to 30, the normal temperature deformation ratios were high but the cell contents were remarkably low.

As has been stated above, only when the foaming agent of the present invention was employed, the foam having both high cell content and low normal temperature deformation ratio was obtained.

As is obvious from the above description, according to the method of the present invention, a foam-insulated electric wire which includes a form insulating layer having a low normal temperature deformation ratio and a high toughness strength can be produced without using Flon.

Since any of the foaming agents employed is a pollution-free liquid, the quantity of the supplied foaming agent can be exactly controlled, this invention is effective in producing a foam-insulated electric wire with a high cell content and a small diameter.

What is claimed is:

1. A method of producing a foam-insulated electric wire, which provides a cell content of at least 50% and a normal temperature deformation ratio not greater than 10%, comprising:
   (a) supplying a polyolefin resin composition into a resin inlet of a screw extruder;
   (b) injecting a foaming agent through a portion between said resin inlet and an extrusion port of said extruder; and
   (c) extruding a molten mixture of said polyolefin resin composition and said foaming agent to coat a surface of a wire conductor with said mixture, wherein said foaming agent is a liquid mixture of at least one liquid compound of Group (I) selected from the group consisting of at least one ether, at least one ester, at least one ketone and at least one saturated hydrocarbon, having boiling points of 100° C. or below, and at least one liquid compound of Group (II) selected from the group consisting of at least one ether, at least one ester, at least one ketone, at least one saturated hydrocarbon and at least one alcohol, having boiling points higher than 100° C., but not exceeding 150° C., said foaming agent comprising said at least one compound of Group (I) and said at least one compound of Group (II) in a mole ratio of Group (I) to Group (II) of 1:1 to 9:1.

2. A method of producing a foam-insulated electric wire, which provides a cell content of at least 50% and a normal temperature deformation ratio not greater than 10%, comprising:
   (a) supplying a polyolefin resin composition into a resin inlet of a screw extruder;
   (b) injecting a foaming agent through a portion between said resin inlet and an extrusion port of said extruder; and
   (c) extruding a molten mixture of said polyolefin resin composition and said foaming agent to coat a surface of a wire conductor with said mixture, wherein said foaming agent is a liquid mixture selected from the group consisting of
      (i) a mixture containing diethyl ether and methyl acetate,
      (ii) a mixture containing diethyl ether and ethyl acetate and
      (iii) a mixture containing methyl acetate and ethyl acetate.

3. The method according to claim 1, wherein said foaming agent is a liquid mixture containing at least diethyl ether and methyl acetate.

4. The method according to claim 1, wherein said foaming agent is a liquid mixture containing at least diethyl ether and ethyl acetate.

5. The method according to claim 1, wherein said foaming agent is a liquid mixture containing at least methyl acetate and ethyl acetate.

6. The method according to claim 1, wherein said foaming agent is a liquid mixture of diethyl ether and methyl acetate, with a molar ratio of the former to the latter being 2:1 to 1:2.

7. The method according to claim 2, wherein the cell content is 51 to 72% and the normal temperature deformation ratio is 2 to 9%.

8. The method according to claim 1, wherein the polyolefin resin is selected from the group consisting of polyethylene and polypropylene; and the liquid mixture is diethyl ether and methyl acetate in a molar ratio of the diethyl ether to the methyl acetate of 1:2 to 2:1.

9. The method according to claim 1, wherein the polyolefin resin is selected from the group consisting of polyethylene and polypropylene; and the liquid mixture is diethyl ether and ethyl acetate in a molar ratio of the diethyl ether to the ethyl acetate of 1:2 to 2:1.

10. The method according to claim 1, wherein the polyolefin is selected from the group consisting of polyethylene and polypropylene; and the liquid mixture is methyl acetate and ethyl acetate in a molar ratio of the methyl acetate to the ethyl acetate of 1:2 to 2:1.

11. The method according to claim 2, wherein the polyolefin resin is selected from the group consisting of polyethylene, polypropylene, an ethylene-acrylic acid copolymer, an ethylene-methacrylate copolymer, an ethylene-ethylacrylate copolymer, an ethylene-vinyl acetate copolymer and an ethylene-propylene copolymer.

* * * * *

UNITED STATES PATENT AND TRADEMARK OFFICE
CERTIFICATE OF CORRECTION

PATENT NO. : 5,391,335
DATED : February 21, 1995
INVENTOR(S) : SAKAMOTO et al

It is certified that error appears in the above-indentified patent and that said Letters Patent is hereby corrected as shown below:

Title page, [56] References Cited,

Under U.S. PATENT DOCUMENTS, insert the following:

| | | | |
|---|---|---|---|
| --4,344,710 | 8/1982 | JOHNSON et al | 366/76 |
| 3,696,179 | 10/1972 | JACOBS | 264/46.1 |
| 3,855,377 | 12/1974 | UEBELHART et al | 264/016.65 |
| 3,856,442 | 12/1974 | GALLAGHER et al | 264/51 |
| 3,962,155 | 6/1976 | USAMOTO et al | 264/45.3 |
| 4,217,319 | 8/1980 | KUMORI | 264/53 |
| 4,468,435 | 8/1984 | SHIMBA et al | 264/45.9 |
| 4,940,629 | 7/1990 | WEBER et al | 264/45.5-- |

Under FOREIGN PATENT DOCUMENTS, insert the following:

| | | |
|---|---|---|
| --1230992 | 5/1971 | United Kingdom |
| 1220053 | 1/1971 | United Kingdom |
| 0229882 | 7/1987 | Europe |
| 2110216 | 6/1983 | United Kingdom--. |

UNITED STATES PATENT AND TRADEMARK OFFICE
CERTIFICATE OF CORRECTION

PATENT NO. : 5,391,335
DATED : February 21, 1995
INVENTOR(S) : SAKAMOTO et al

It is certified that error appears in the above-indentified patent and that said Letters Patent is hereby corrected as shown below:

Insert --OTHER DOCUMENTS

WORLD PATENT INDEX, week 7613, accession no. 76-23477x, Derwent Publications Ltd., London, GB; JP-A-51 017 981, abstract, Feb. 1976--.

Signed and Sealed this

Twenty-fourth Day of September, 1996

Attest:

BRUCE LEHMAN

Attesting Officer     Commissioner of Patents and Trademarks